(12) United States Patent
Hong et al.

(10) Patent No.: US 10,211,723 B2
(45) Date of Patent: Feb. 19, 2019

(54) REGULATOR FOR DC-DC HYBRID-MODE POWER REGULATION

(71) Applicant: MEDIATEK Inc., Hsin-Chu (TW)

(72) Inventors: Shan-Fong Hong, Taipei (TW);
Chih-Chen Li, Taichung (TW);
Kuan-Yu Chu, Taipei (TW);
Chien-Wei Kuan, Hsinchu (TW);
Yen-Hsun Hsu, Hsinchu County (TW)

(73) Assignee: MEDIATEK INC., Hsin-Chu (TW)

( * ) Notice: Subject to any disclaimer, the term of this patent is extended or adjusted under 35 U.S.C. 154(b) by 146 days.

(21) Appl. No.: 15/334,332

(22) Filed: Oct. 26, 2016

(65) Prior Publication Data

US 2017/0310211 A1    Oct. 26, 2017

Related U.S. Application Data

(60) Provisional application No. 62/326,898, filed on Apr. 25, 2016.

(51) Int. Cl.
*H02M 3/04* (2006.01)
*H02M 1/08* (2006.01)
*H02M 1/00* (2006.01)

(52) U.S. Cl.
CPC .............. *H02M 3/04* (2013.01); *H02M 1/08* (2013.01); *H02M 2001/0032* (2013.01)

(58) Field of Classification Search
CPC ... H02M 3/04; H02M 1/08; H02M 2001/0032
See application file for complete search history.

(56) References Cited

U.S. PATENT DOCUMENTS

| 7,382,114 | B2 | 6/2008 | Groom |
| 7,999,528 | B2 | 8/2011 | Chen et al. |
| 8,427,123 | B2 | 4/2013 | Dearborn |
| 10,020,725 | B2 | 7/2018 | Su |
| 2008/0022139 | A1* | 1/2008 | Lin ............... H02M 3/1588 713/320 |

(Continued)

FOREIGN PATENT DOCUMENTS

TW    201509091 A    3/2015

OTHER PUBLICATIONS

TIPO Office Action dated Jul. 26, 2018 in Taiwan application (No. 106113579).

*Primary Examiner* — Adolf Berhane
*Assistant Examiner* — Bart Iliya
(74) *Attorney, Agent, or Firm* — McClure, Qualey & Rodack, LLP

(57) ABSTRACT

The invention provides a regulator for DC-DC hybrid-mode power regulation of an output voltage and a load current. The regulator may include a controller and a back-end circuit. The controller controls the output voltage and the load current by charging a connection node when a driving signal is at an on-level, and stopping charging the connection node when the driving signal is at an off-level. The back-end circuit is coupled to the controller, capable of switching between a first mode and a second mode to control transition of the driving signal by different schemes. The back-end circuit switches from the second mode to the first mode when a mode-switch criterion is satisfied, and whether the mode-switch criterion is satisfied is independent of a measurement of the output voltage.

10 Claims, 13 Drawing Sheets

(56) References Cited

U.S. PATENT DOCUMENTS

| | | | |
|---|---|---|---|
| 2011/0291596 A1* | 12/2011 | Lu ........................... | H02P 27/16 |
| | | | 318/400.09 |
| 2012/0200271 A1* | 8/2012 | Henzler ................ | H02M 3/156 |
| | | | 323/235 |
| 2012/0281447 A1* | 11/2012 | Heo .................... | H02M 3/1588 |
| | | | 363/74 |
| 2015/0035511 A1 | 2/2015 | Mei | |
| 2017/0187282 A1* | 6/2017 | Wang ..................... | H02M 1/12 |

* cited by examiner

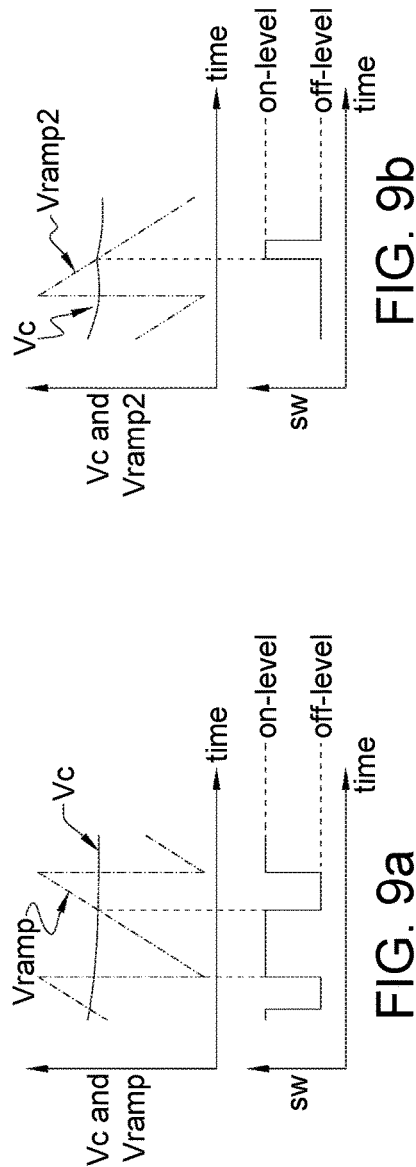
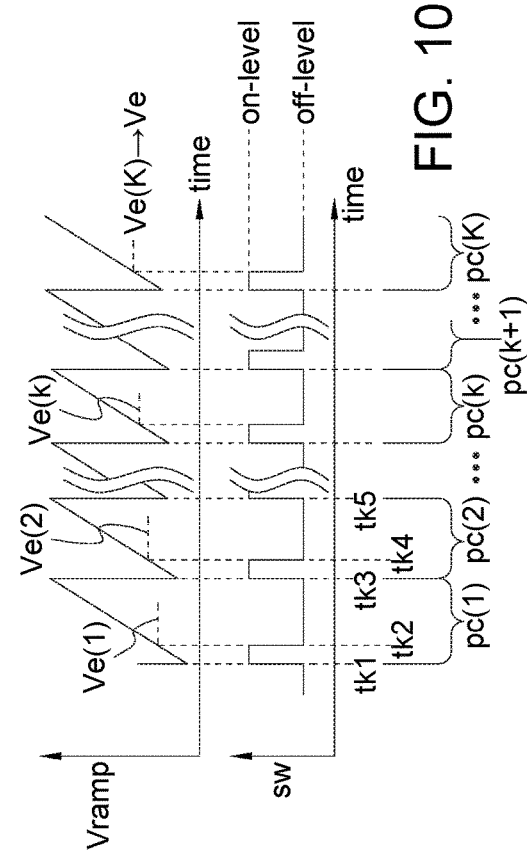
FIG. 9a
FIG. 9b
FIG. 10

REGULATOR FOR DC-DC HYBRID-MODE POWER REGULATION

This application claims the benefit of U.S. provisional application Ser. No. 62/326,898, filed Apr. 25, 2016, the subject matter of which is incorporated herein by reference.

FIELD OF THE INVENTION

The present invention relates to a regulator for DC-DC hybrid-mode power regulation, and more particularly, to a regulator which switches modes according to advantageous mode-switch criterions, and achieves smoother transients when switching modes.

BACKGROUND OF THE INVENTION

Regulator for DC-DC power regulation, e.g., step-down regulator (converter) or buck regulator, can convert unregulated power of a DC (direct-current) power source to regulated voltage and current for a load, and is therefore essential for modern electronic, such as smart phone, mobile phone, tablet/notebook/portable computer, digital camera, digital camcorder, handheld game console, or wearable gadget (glasses, wrest ring, watch, armlet, earphone, headset), etc.

SUMMARY OF THE INVENTION

An objective of the invention is providing a regulator (e.g., 400 in FIG. 4) for DC-DC hybrid-mode power regulation of an output voltage (e.g., Vout) and a load current (e.g., iLoad). The regulator may include a controller (e.g., 402) and a back-end circuit (e.g., 420). The controller is for controlling the output voltage and the load current by charging a connection node (e.g., n0) when a driving signal (e.g., sw) is at an on-level, and stopping charging the connection node when the driving signal is at an off-level. The back-end circuit is coupled to the controller, capable of switching between a first mode and a second mode to control transition of the driving signal by different schemes. The back-end circuit switches from the second mode to the first mode when a mode-switch criterion is satisfied; and whether the mode-switch criterion is satisfied is independent of a measurement of the output voltage.

In an embodiment, the mode-switch criterion is satisfied when the load current is greater than an upper current threshold (e.g., iTH_H). Also, the back-end circuit switches from the first mode to the second mode when the load current is less than a lower current threshold (e.g., iTH_L). In an embodiment, the upper current threshold is greater than the lower current threshold.

In an embodiment, the mode-switch criterion is satisfied when the off-level lasts less than a time threshold (e.g., ToffTH1). In an embodiment, the back-end circuit switches from the first mode to the second mode when the off-level lasts longer than a second time threshold (e.g., ToffTH2). In an embodiment, the back-end circuit switches from the first mode to the second mode when the on-level lasts less than a third time threshold (e.g., TonTH). In an embodiment, the mode-switch criterion is satisfied when a frequency (e.g., f_on) for the driving signal to transit from the off-level to the on-level is greater than a frequency threshold (e.g., f_TH). In an embodiment, the back-end circuit switches from the first mode to the second mode when a current (e.g., iL) at the connection node crosses a current level (e.g., i0) for more than a predetermined number (e.g., NzxTH) of times. According to an embodiment, in the first mode, the back-end circuit controls the driving signal to transit from the off-level to the on-level when a clock (e.g., ck) of a constant frequency triggers.

According to an embodiment, in the first mode, the back-end circuit enables the driving signal to transit from the off-level to the on-level when a control voltage (e.g., Vc) intersects a ramp signal (e.g., Vramp) which starts ramping when a trigger signal (e.g., S1) transits from the off-level to the on-level. The back-end circuit switches from the second mode to the first mode by: when the mode-switch criterion is satisfied, operating in a prediction mode (e.g., FIGS. 10-12) before starting the first mode. In the prediction mode, the back-end circuit controls transition of the driving signal by the same scheme as the second mode, and further utilizes the driving signal as the trigger signal for triggering the ramp signal to start ramping when the driving signal transits from the off-level to the on-level, and recording an end voltage (e.g., Ve in FIG. 10) which the ramp signal reaches when the driving signal transits from the on-level to the off-level. When exiting the prediction mode, the back-end circuit sets the control voltage to the end voltage to start the first mode. When starting the first mode, the back-end circuit utilizes a clock (e.g., ck in FIG. 4) of a constant frequency as the trigger signal.

The control voltage is a voltage at a control node (e.g., nc in FIG. 4). In an embodiment, the back-end circuit may include an error amplifier (e.g., 404) and a predictor (e.g., 412). The error amplifier is coupled to the control node for driving the control node according to a different between a reference voltage (e.g., Vref) and the output voltage. The predictor is coupled to the control node, a first capacitor (e.g., C1) and a second capacitor (e.g., C2). In the second mode and the prediction mode, the predictor conducts the second capacitor to the control node, and stops conducting the first capacitor to the control node. In the prediction mode, the predictor charges the first capacitor, so as to record the end voltage. When starting the first mode, the predictor conducts the first capacitor to the control node for setting the control voltage to the end voltage, and stops conducting the second capacitor to the control node.

According to an embodiment, in the prediction mode, the back-end circuit utilizes the driving signal as the trigger signal for iteratively triggering the ramp signal to start ramping for a number of prediction cycles (e.g., pc(k), pc(k+1) in FIG. 10), and updates the end voltage in each of the prediction cycles. According to an embodiment, in each of the prediction cycles, the predictor charges the first capacitor when the driving signal is at the on-level to update the end voltage. In one of the prediction cycles, the predictor discharges the first capacitor when the driving signal is at the off-level.

In an embodiment, the back-end circuit may further include a ramp comparator (e.g., 406 in FIG. 4) and a ramp circuit (e.g., 408). The ramp comparator is coupled to the control node. The ramp circuit is coupled to the ramp comparator. In the first mode, the ramp comparator compares whether the control voltage intersects the ramp signal. In the first mode and the prediction mode, the ramp circuit controls the ramp signal to start ramping when the trigger signal transits from the off-level to the on-level. In the second mode, the ramp circuit controls the ramp signal not to ramp.

An objective of the invention is providing a regulator (e.g., 400 in FIG. 4) for DC-DC hybrid-mode power regulation of an output voltage and a load current. The regulator may include a controller and a back-end circuit. The controller is for controlling the output voltage and the load current by charging a connection node when a driving signal is at an on-level, and stopping charging the connection node when the driving signal is at an off-level. The back-end circuit is coupled to the controller, capable of switching between a first mode and a second mode to control transition of the driving signal by different schemes. In the first mode, the back-end circuit utilizes a clock as a trigger signal, and controls the driving signal to transit from the off-level to the on-level when a control voltage intersects a ramp signal which starts ramping when the trigger signal transits from the off-level to the on-level. The back-end circuit switches from the second mode to the first mode by operating in a prediction mode before starting the first mode. In the prediction mode, the back-end circuit controls transition of the driving signal by the same schemes as the second mode, and further utilizes the driving signal as the trigger signal for triggering the ramp signal to start ramping when the driving signal transits from the off-level to the on-level, and recording an end voltage which the ramp signal reaches when the driving signal transits from the on-level to the off-level. When exiting the prediction mode, the back-end circuit sets the control voltage to the end voltage to start the first mode.

Numerous objects, features and advantages of the present invention will be readily apparent upon a reading of the following detailed description of embodiments of the present invention when taken in conjunction with the accompanying drawings. However, the drawings employed herein are for the purpose of descriptions and should not be regarded as limiting.

BRIEF DESCRIPTION OF THE DRAWINGS

The above objects and advantages of the present invention will become more readily apparent to those ordinarily skilled in the art after reviewing the following detailed description and accompanying drawings, in which:

FIGS. 9a and 9b respectively illustrate operation examples in a first mode and a second mode;

FIG. 10 illustrates operations of a prediction mode according to an embodiment of the invention;

DETAILED DESCRIPTION OF PREFERRED EMBODIMENTS

Figure 1:
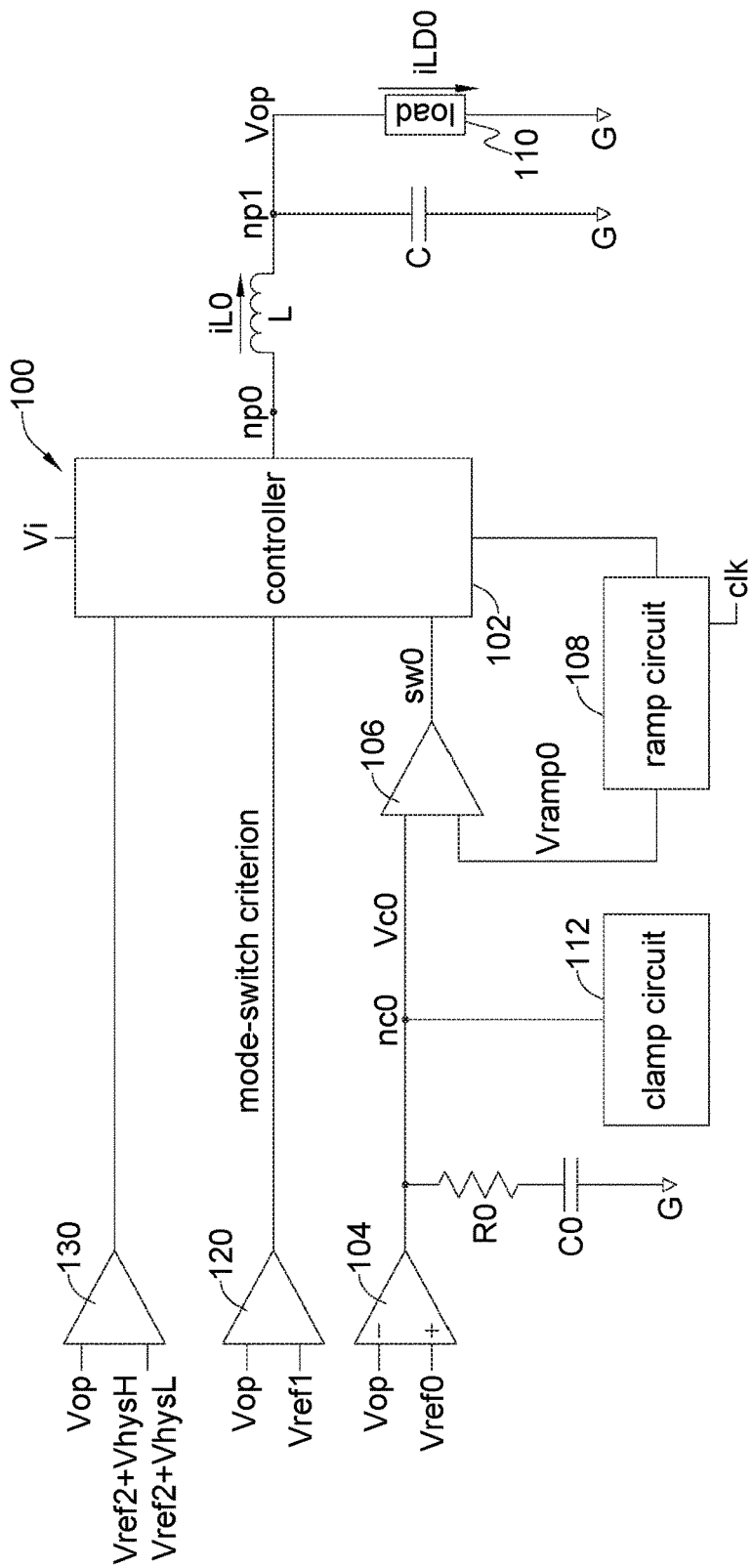
FIG. 1 (prior art) illustrates a prior art regulator.

Please refer to FIG. 1 illustrating a prior art regulator 100. The regulator 100 supplies a regulated output voltage Vop and load current iLD0 to a load 110 coupled between a node np1 and a ground node G. The regulator 100 includes a controller 102, an error amplifier 104, a resistor R0, a capacitor C0, a ramp comparator 106, a ramp circuit 108 and a clamp circuit 112. The error amplifier 104 has a positive input (labeled by "+" in FIG. 1) coupled to a constant reference voltage Vref0, a negative input (labeled by "−") coupled to a feedback measurement of the voltage Vop, and an output coupled to a node nc0. The resistor R0 and the capacitor C0 is serially coupled between the nodes nc0 and G. The clamp circuit 112 is coupled to the node nc0. The comparator 106 is coupled between the node nc0, the ramp circuit 108 and the controller 102.

The controller 102 controls the voltage Vop and the current ILD0 by charging a node np0 when a driving signal sw0 is at an on-level, and stopping charging the node no1 when the driving signal sw0 is at an off-level. To cooperate with the controller 102, an inductor L is coupled between the nodes np0 and np1, and a capacitor C is coupled between the nodes np1 and G. When the controller 102 charges the node np0 by relaying an unregulated power source Vi to the node np0, energy supplied by the power source Vi is charged to the inductor L, and the voltage Vop ripples upward. When the controller 102 stops charging the node np0 by stopping relaying the unregulated power source Vi to the node np0, energy charged to the inductor L discharges to the load 110, and the voltage Vop ripples downward.

Figure 2:
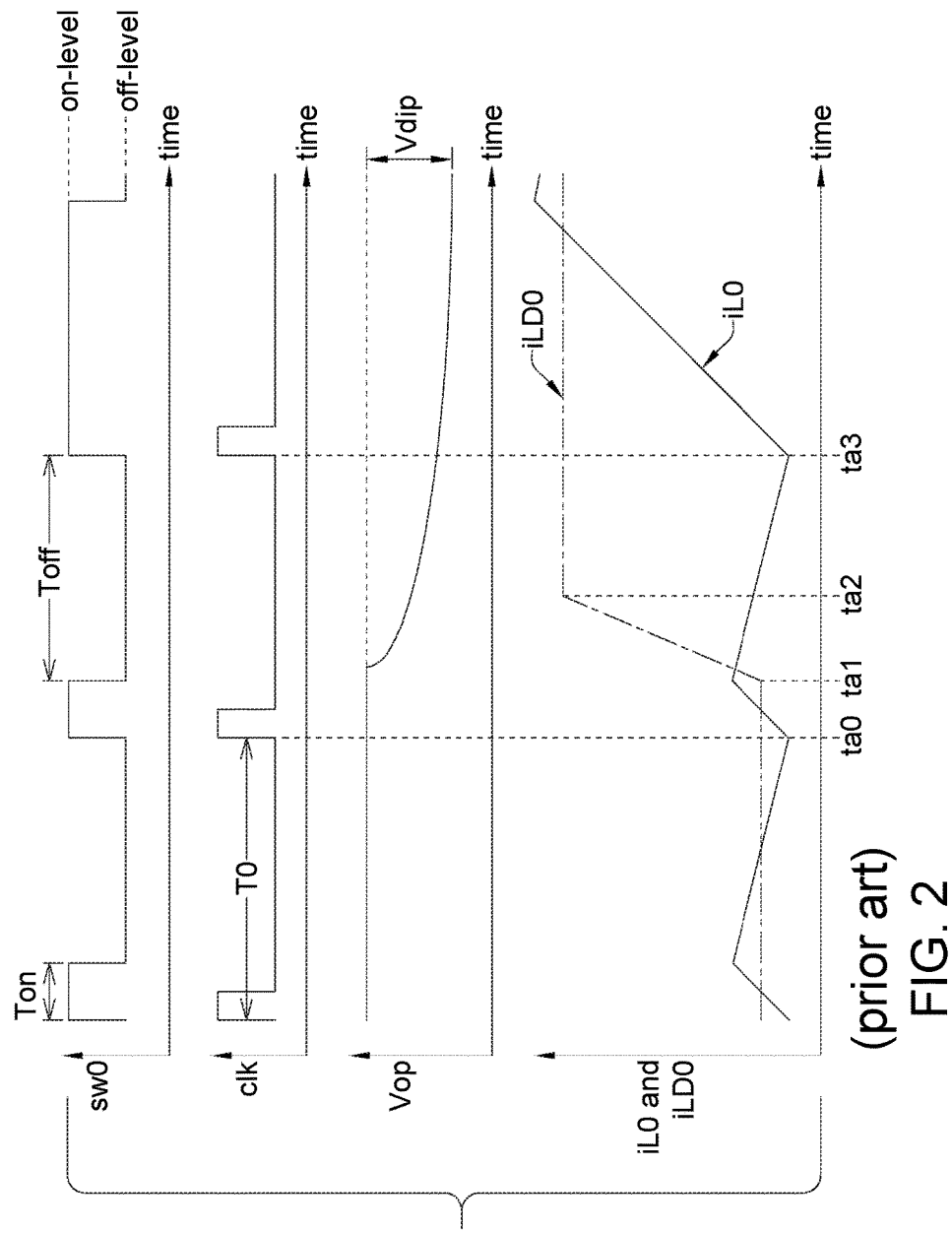
FIG. 2, FIG. 3a and FIG. 3b (prior art) illustrate operations of the regulator shown in FIG. 1.

The regulator 100 can operate in a PWM (pulse width modulation) mode to control the driving signal to transit between the on-level and off-level. Along with FIG. 1, please refer to FIG. 2 illustrating the PWM operation of the regulator 100. In the PWM mode, the error amplifier 104 drives the node nc0 according to a different between the reference voltage Vref0 and the output voltage Vop, thus a control voltage Vc0 is built at the node nc0. The ramp circuit 108 generates a saw-tooth ramp signal Vramp0, and controls the ramp signal Vramp0 to start ramping (e.g., linearly rising at a given slope) at each rising edge of a clock clk, wherein the clock clk is of a constant period T0. The comparator 106 compares whether the control voltage Vc0 intersects the ramp signal Vramp0, and accordingly controls the driving signal sw0 to transit when the control voltage Vc0 intersects the ramp signal Vramp0. The clamp circuit 112 clamps the control voltage Vc0.

The PWM mode suffers slower response to change of load. As shown in FIG. 2, demand of the load current iLD0 may rise rapidly between time points ta1 and ta2. However, the regulator 100 fails to instantly respond such demand rise because the regulator 100 has stopped charging when the demand rises, and will not resume charging until a subsequent rising edge of the clock clk, which is at a time point ta3. Thus, the output voltage Vop degrades by a great voltage drop Vdip. In addition to the PWM mode, PFM (pulse frequency modulation) mode can be adopted to control transition of the driving signal sw0. While the PWM mode charges regularly at a fix interval (i.e., the period T0 of the clock clk), the PFM mode charges at irregular and variable intervals.

The regulator 100 switches from the PFM mode to the PWM mode when a mode-switch criterion is satisfied. According to prior art, the mode-switch criterion is satisfied when the feedback measurement of the output voltage Vop indicates that the output voltage Vop drops below a given voltage Vref1. The regulator 100 therefore includes the comparator 120 to compare whether (the feedback measurement of) the output voltage Vop is below the voltage threshold Vref1. In other words, the mode-switch criterion of the regulator 100 is dependent on measurement of the output voltage Vop.

Figure 3A:
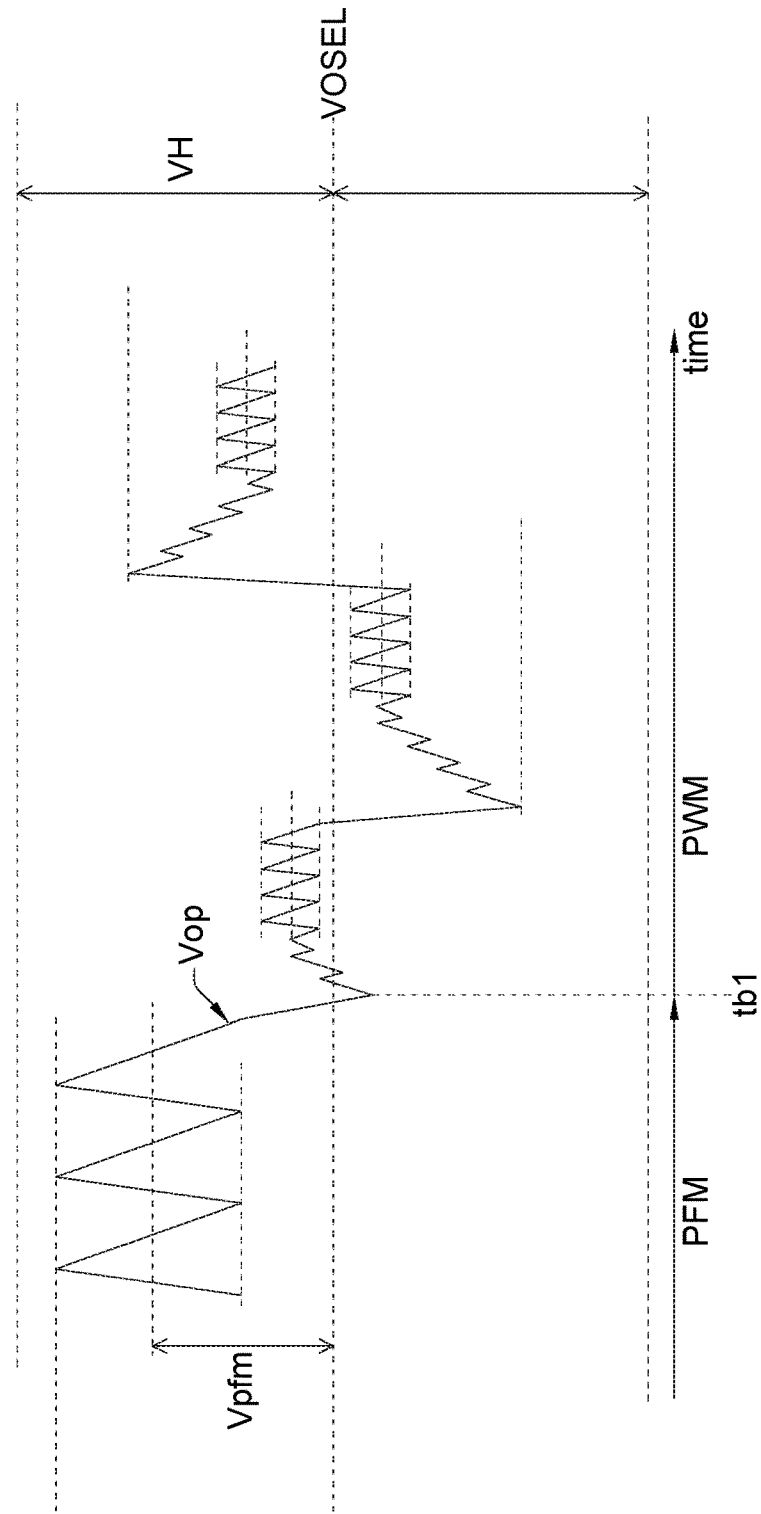

Along with FIG. 1, please refer to FIG. 3a illustrating a waveform of the output voltage Vop when the regulator 100 operates in the PWM and PFM modes. As shown in FIG. 3a, the regulator 100 operates in the PFM mode before a time point tb1, at which the mode-switch criterion is satisfied, and then the regulator 100 switches to operate in the PFM mode. In either of the two modes, charging and discharging of the regulator 100 cause the voltage Vop to ripple up and down. However, while the regulator 100 regulates the voltage Vop to track a target voltage VOSEL, the regulator 100 needs to raise the voltage Vop above the voltage VOSEL by an additional voltage Vpfm to operate in the PFM mode. Because the mode-switch criterion of the regulator 100 is dependent on the voltage Vop, if the regulator 100 does not raise the voltage Vop by the voltage Vpfm in the PFM mode, the regulator 100 will rapidly switch back to the PWM mode even when demand of load remains unchanged but the Vop ripples down due to discharging, and consequently fail to keep at the PFM mode for a reasonably and sufficiently long time.

In other words, since the mode-switch criterion of the regulator 100 is dependent on the voltage Vop, the voltage Vop requires to be distinguishable respectively for the PWM and PFM modes. To achieve the distinction, the regulator 100 needs to raise the voltage Vop by the voltage Vpfm during the PFM mode, and therefore further includes the comparator 130 (FIG. 1) to detect whether the voltage Vop is properly raised by comparing the voltages Vop with voltages Vref2+VhysH and Vref2+VhysL. However, raising the voltage Vop by the voltage Vpfm also suppresses margins to build hysteresis and to tolerate noise and variations. For example, as shown in FIG. 3a, an acceptable upper bound for the voltage Vop to vary is VOSEL+VH, but raising the voltage Vop by the voltage Vpfm in the PFM mode will push the voltage Vop closer to the upper bound. Consequently, performance of the regulator 100 is compromised.

Figure 3B:
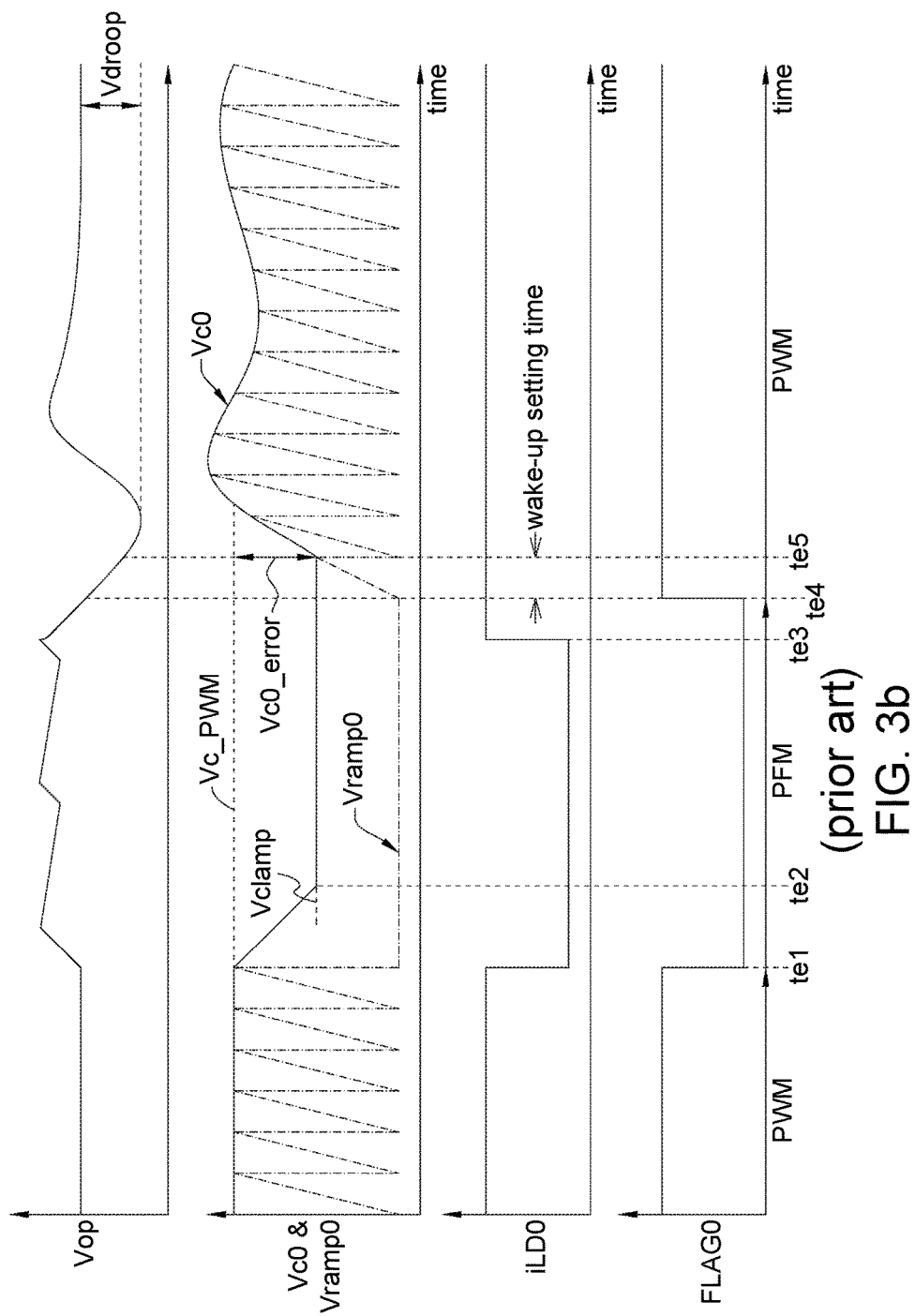

Along with FIG. 1, please refer to FIG. 3b illustrating mode switching operations of the regulator 100 by waveforms of the output voltage Vop, the control voltage Vc0, the ramp signal Vramp0, the load current iLD0 and a mode flag signal FLAG0 which is at a high level during the PWM mode, and at a low level when not in the PWM mode. As shown in FIG. 3b, the regulator 100 operates in the PWM mode before a time point te1; in the PWM mode, the ramp signal Vramp0 ramps and falls regularly, and the control voltage Vc0 remains steady at a voltage value Vc_PWM since the load current iLD0 is not changing. At the time point te1, the output voltage Vop increases due to lowered demand of the load current ILD0; in response, the regulator 100 switches to the PFM mode with the ramp signal Vramp0 controlled to stop ramping, and the control voltage Vc0 starts to decrease because of the increasing output voltage Vop. Starting from a time point te2, the clamp circuit 112 clamps the control voltage Vc0 at a voltage value Vclamp.

At a time point te3, demand of the load current iLD0 increases and consequently causes the output voltage Vop to decrease fast; in response, the regulator 100 switches to the PWM mode at a time point te4, and controls the ramp signal Vramp0 to resume regular ramping. After a wake-up setting time (interval), at a time point te5, the clamp circuit 112 releases clamping of the control voltage Vc0, and the control voltage Vc0 starts to increase because the error amplifier 104 starts to charge the capacitor C0 according to the enlarging difference between the voltage Vref0 and the decreasing output voltage Vop.

For steady operation of the PWM mode, the control voltage Vc0 is expected to return to the voltage value Vc_PWM after the time point te5. However, as shown in FIG. 3b, the control voltage Vc0 suffers a huge voltage gap Vc0_error between the previous value Vclamp of the PFM mode and the expected value Vc_PWM of the PWM mode. For filling the voltage gap Vc0_error, the error amplifier 104 must spend a long charging time to charge the capacitor C0, since capacitance of the capacitor C0 is large to tolerate fluctuation. Owing to the long charging time of the control voltage Vc0, the output voltage Vop suffers a deep voltage droop Vdroop.

Figure 4:
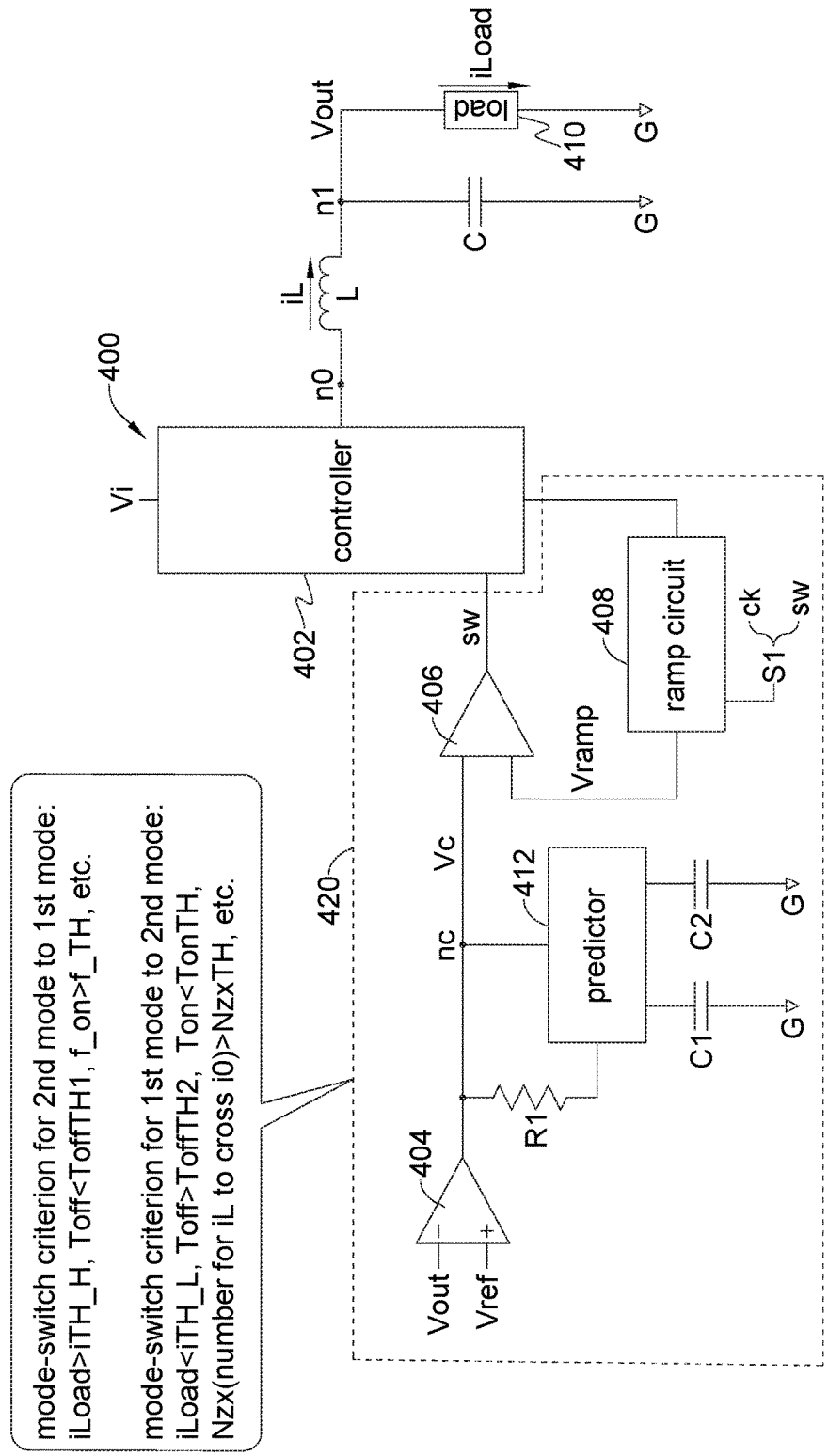
FIG. 4 illustrates a regulator according to an embodiment of the invention.

Please refer to FIG. 4 illustrating a regulator 400 according to an embodiment of the invention, which implements hybrid-mode power regulation of an output voltage Vout and a load current iLoad for a load 410 coupled between a node n1 and a ground node G. For example, the load 410 may be a processor, a CPU (central processing unit), a GPU (graphic processing unit), a RAM (random access memory) module, a nonvolatile memory module, and/or a wireless communication module such as a modem (modulator-demodulator), and/or an RF (radio-frequency) receiver, transmitter, transceiver. The regulator 400 includes a controller 402 and a back-end circuit 420.

The control 402 controls the output voltage Vout and the load current iLoad by charging a connection node n0 when a driving signal sw is at an on-level, and stopping charging the connection node when the driving signal is at an off-level. To cooperate with the controller 402, an inductor L is coupled between the nodes n0 and n1, and a capacitor C is coupled between the nodes n1 and G. The controller 402 charges the node n0 by relaying an unregulated DC power source Vi to the node n0, so energy supplied by the power source Vi is charged to the inductor L and the load 410. The controller 402 stops charging the node np0 by stopping relaying the power source Vi to the node n0, and energy charged to the inductor L discharges to the load 410.

The back-end circuit 420 is coupled to the controller 402, capable of switching between a first mode and a second mode to control transition of the driving signal sw by different schemes. According to an embodiment of the invention, the first mode may adopt a regular charging scheme; i.e., in the first mode, the back-end circuit 420 controls the driving signal sw to transit from the off-level to the on-level regularly (periodically). On the other hand, the second mode may adopt a dynamic charging scheme; for example, in the second mode, the back-end circuit 420 controls the driving signal sw to transit from the off-level to the on-level dynamically and adaptively according to the voltage Vout, rather than regularly.

The back-end circuit 420 switches from the second mode to the first mode when a second-to-first mode-switch criterion is satisfied. According to the invention, the second-to-first mode-switch criterion is arranged to reflect whether load is heavy; moreover, whether the second-to-first mode-switch criterion is satisfied is independent of a measurement of the output voltage Vout. The back-end circuit 420 switches from the first mode to the second mode when a first-to-second mode-switch criterion is satisfied. According to the invention, the first-to-second mode-switch criterion is arranged to reflect whether load is light. In other words, according to an embodiment of the invention, the first mode of regular charging and the second mode of dynamic charging are respectively utilized for heavier and lighter loading; the back-end circuit 420 switches from the second mode to the first mode when demand of the load 410 becomes greater (heavier), and switches from the first mode to the second mode when demand of the load 410 becomes less (lighter).

Figure 5:
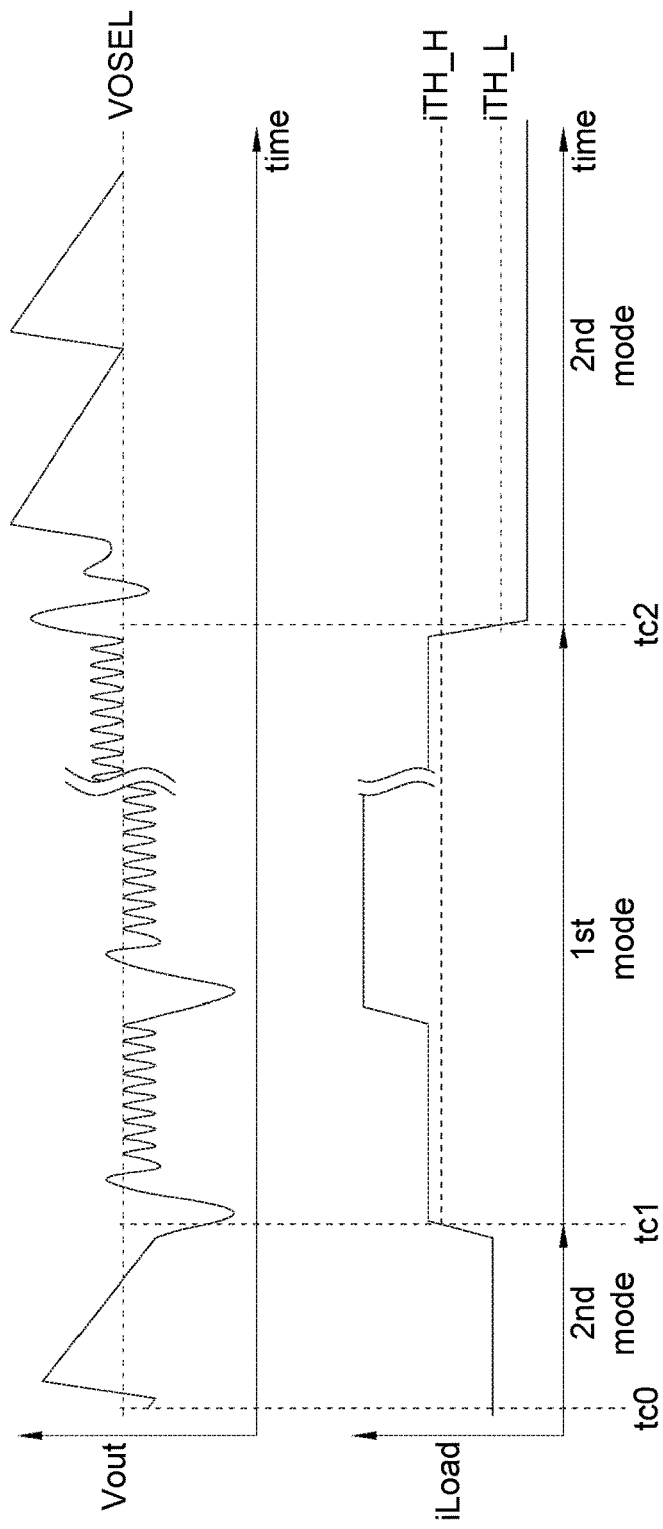
FIG. 5 and FIG. 6 illustrate operation examples of the regulator shown in FIG. 4.

Along with FIG. 4, please refer to FIG. 5 illustrating operations of the regulator 400 according to an embodiment of the invention. In the embodiment of FIG. 5, the secondto-first mode-switch criterion is satisfied when the load current iLoad is greater than an upper current threshold iTH_H. As shown in FIG. 5, the regulator 400 operates in the second mode since a time point tc0; at a time point tc1, the mode-switch criterion is satisfied because the current iLoad demanded by the load 410 increases above the threshold iTH_H, and then the regulator 400 switches to operate in the first mode.

In an embodiment, the back-end circuit 420 of the regulator 400 switches from the first mode to the second mode when the load current is less than a lower current threshold iTH_L. In an embodiment, the upper current threshold iTH_H is greater than the lower current threshold iTH_L. As shown in FIG. 5; at a time point tc2, the current iLoad demanded by the load 410 decreases below the threshold iTH_L, so the regulator 400 switches from the first mode to the second mode.

By adopting mode-switch criterion independent of feedback measurement of the voltage Vout, the regulator 400 does not need to raise the voltage Vout for distinguishing different modes. As shown in FIG. 5, the regulator 400 allows the voltage Vout to ripple above and below the target voltage VOSEL (within acceptable bounds) both in the first mode and the second mode. On the contrary, as shown in FIG. 3a, for staying at the PFM mode, the regulator 100 needs to raise the voltage Vout to prevent it from rippling below the voltage VOSEL when demand of load remains unchanged. The regulator 400 according to the invention therefore avoids disadvantages of the regulator 100.

According to the invention, the mode-switch criterions may adopt other references, not limited to the load current iLoad. In an embodiment, the second-to-first mode-switch criterion is satisfied when the off-level lasts less than a time threshold ToffTH1. While operating in the second mode, when demand of the load 410 increases, the back-end circuit 420 may control the driving signal sw to transit from the off-level to the on-level more frequently, thus a time Toff for the driving signal to stay at the off-level is shortened. In other words, whether the time Toff is shorter than the time threshold ToffTH1 may reflect whether loading is heavy, and whether the back-end circuit 420 needs to switch from the second mode to the first mode. Similarly, the back-end circuit 420 may switch from the first mode to the second mode when the off-level lasts longer than a second time threshold ToffTH2. While operating in the first mode, when demand of the load 410 decreases, the back-end circuit 420 may control the driving signal sw to stay at the off-level longer. In other words, whether the time Toff is longer than the time threshold ToffTH2 reflects whether loading is light, and whether the back-end circuit 420 needs to switch from the first mode to the second mode.

In an embodiment, the back-end circuit 420 may switch from the first mode to the second mode when the on-level lasts less than a third time threshold TonTH. While operating in the first mode, when demand of the load 410 decreases, the back-end circuit 420 may control the driving signal sw to stay at the on-level shorter; i.e., shorten a time Ton for the signal sw to remain the on-level. Thus, whether the time Ton is shorter than the time threshold TonTH reflects whether loading is light, and whether the back-end circuit 420 may switch from the first mode to the second mode. The time thresholds ToffTH1 and ToffTH2 (and TonTH) may be different.

In an embodiment, the second-to-first mode-switch criterion is satisfied when a frequency f_on for the driving signal sw to transit from the off-level to the on-level is greater than a frequency threshold f_TH. While operating in the second mode, when demand of the load 410 increases, the back-end circuit 420 may control the driving signal sw to transit from the off-level to the on-level more frequently, thus whether the frequency f_on is higher than the threshold f_TH reflects whether loading demand is heavy, and whether the regulator 400 should switch to the first mode.

Figure 6:
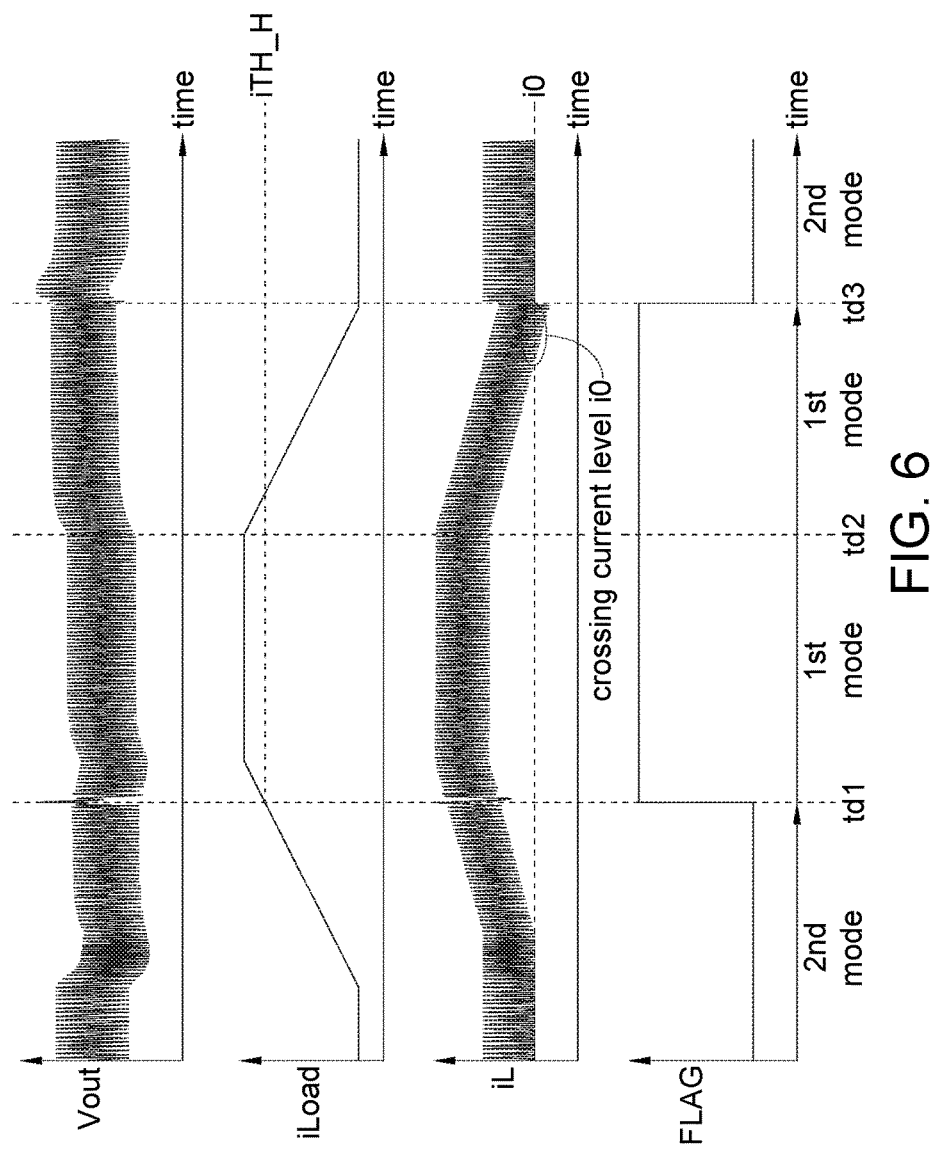

In an embodiment, the back-end circuit 420 switches from the first mode to the second mode when a current iL at the node n0 crosses a current level i0 (e.g., zero current) for more than a predetermined number NzxTH of times. While in the first mode, the current iL which flows through the inductor L decreases when demand of the current iLoad decreases, and eventually ripples around the current level i0. Therefore, when a number Nzx for the current iL to cross the current level i0 is greater than the number NzxTH, loading demand is considered low enough for the regulator 400 to switch to the second mode. Along with FIG. 4, please refer to FIG. 6 illustrating operations of the regulator 400 according to an embodiment of the invention, wherein a mode flag signal FLAG is at a high level when the regulator 400 operates in the first mode, and is at a low level when the regulator 400 does not operate in the first mode. In the embodiment of FIG. 6, the regulator 400 operates in the second mode before a time point td1; at the time point td1, the current iLoad demanded by the load 410 increases above a current threshold iTH_H to satisfy the second-to-first mode switch criterion, and the regulator 400 switches from the second mode to the first mode. At a time point td2, the current iLoad starts to decrease, and therefore the current iL also decreases. At a time point td3, the current iL has crossed the current level i0 more than the number NzxTH to satisfy the first-to-second mode-switch criterion, so the regulator 400 switches from the first mode to the second mode.

The second-to-first mode-switch criterion for the regulator 400 to switch from the second mode to the first mode and the first-to-second mode-switch criterion for the regulator 400 to switch from the first mode to the second mode may use identical or different references. For example, in an embodiment, the second-to-first mode-switch criterion for switching from the second mode to the first mode may be iLoad>iTH_H, and the first-to-second mode-switch criterion for switching from the first mode to the second mode may be iLoad<iTH_L. In a different embodiment, the second-to-first mode-switch criterion for switching from the second mode to the first mode may be Toff<ToffTH1, and the first-to-second mode-switch criterion for switching from the first mode to the second mode may be iLoad<iTH_L.

Figure 7:
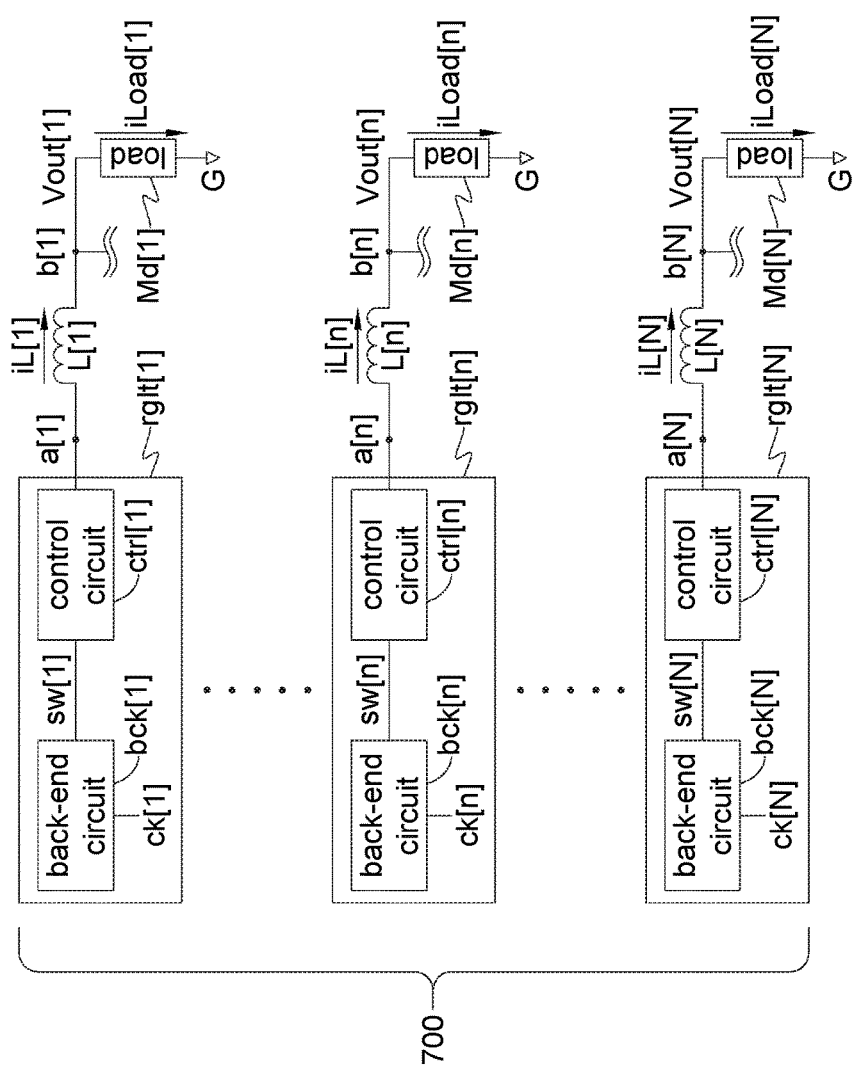
FIG. 7 illustrates multiple regulators according to an embodiment of the invention.

As aforementioned, according to an embodiment of the invention, the first mode of regular charging and the second mode of dynamic charging are respectively utilized for heavier and lighter loading. Such arrangement is beneficial to make full use of the advantages of both the regular charging and the dynamic charging, and prevent disadvantages of the regular charging and the dynamic charging. Please refer to FIG. 7 illustrating an electronic 700 according to the invention. Modern electronic, such as the electronic 700, needs multiple regulators rglt[1] to rglt[N] to regulate voltages Vout[1] to Vout[N] and currents iLoad[1] to iLoad[N] respectively for multiple modules (as load) Md[1] to Md[N], including CPU, GPU, RAM, modem, etc. For example, the regulators rglt[1] to rglt[N] may be integrated in a PMIC (power management integrated circuit). Similar to the regulator 400 in FIG. 4, each regulator rglt[n](for n=1 to N) includes a controller ctrl[n] and a back-end circuit bck[n]. The controller ctrl[n] charges a connection node a[n] when a driving signal sw[n] is at on-level, and stops charging the connection node when the driving signal is at off-level. The module Md[n] is coupled to the controller ctrl[n] via an inductor L[n] at a node b[n]. The back-end circuit bck[n] is capable of switching between a first mode of regular charging and a second mode to control transition of the driving signal sw[n] by different schemes. According to the invention, each regulator rglt[n] operates in the first mode of regular charging by controlling the driving signal sw[n] to transit from the off-level to the on-level when a clock ck[n] of a constant frequency triggers, e.g., to transit from the off-level to the on-level at every rising edge of the clock ck[n].

When the modules Md[1] to Md[N] operate in normal mode for full functionality and therefore drain heavy currents from the regulators rglt[1] to rglt[N], the modules Md[1] to Md[N] are also sensitive to interference (noise). By operating in the first mode of regular charging under properly staggered clocks ck[1] to ck[N] to serve the heavier loading of the normal mode, the regulators rglt[1] to rglt[N] avoid unpredictable and uncontrollable interferences, including uncertainty due to dynamic (and therefore irregular) charging.

Figure 8:
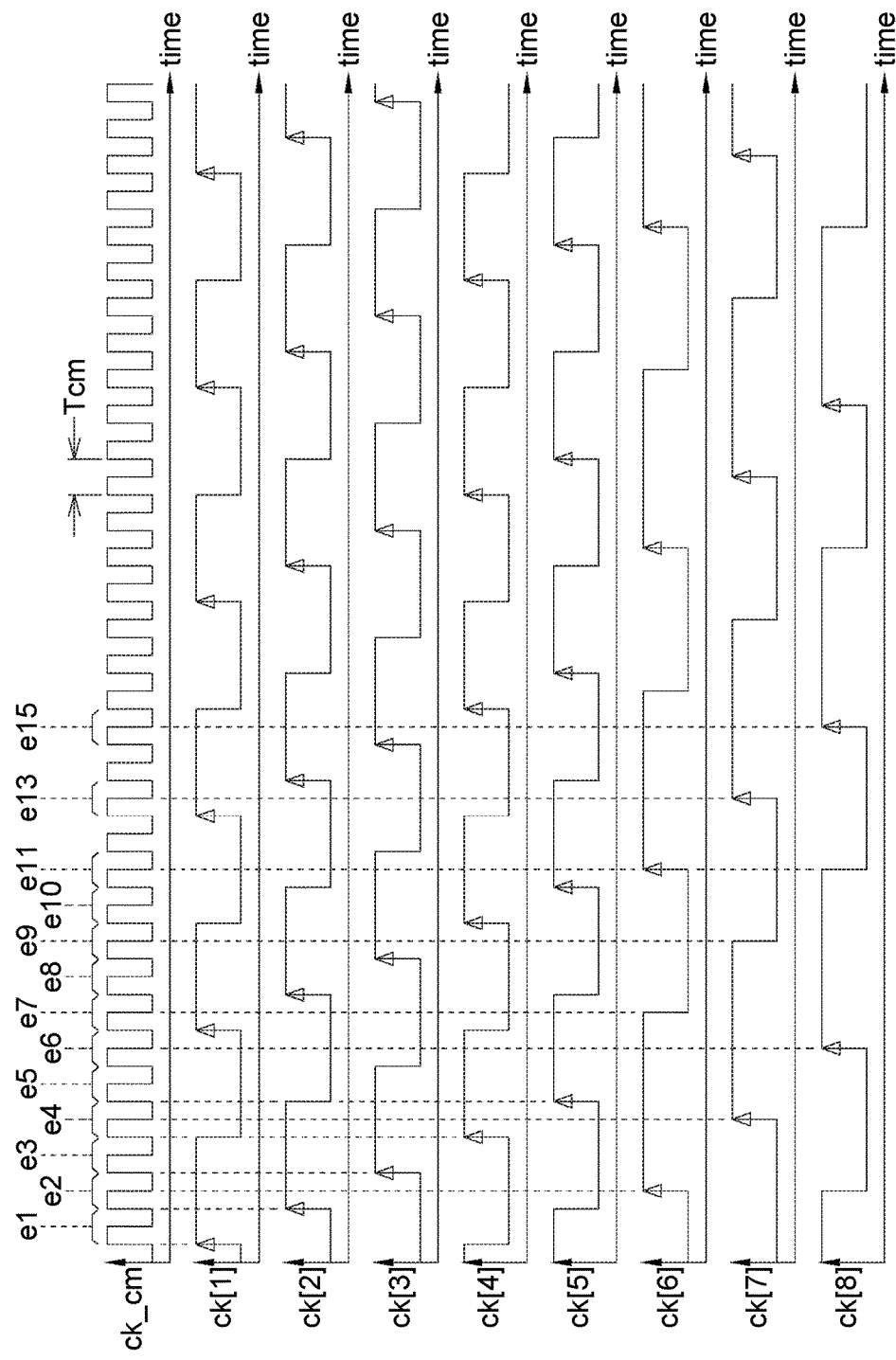
FIG. 8 illustrates example clocks according to an embodiment of the invention, for triggering regular charging of regulators in FIG. 7.

Along with FIG. 7, please refer to FIG. 8 illustrating example clocks ck[1] to ck[8] for triggering regular charging of regulators rglt[1] to rglt[8] according to an embodiment of the invention. As shown in FIG. 8, the clocks ck[1] to ck[8] may be generated according to a common clock ck_cm of a constant period Tcm. In FIG. 8, the clocks ck[1] to ck[4] are a set of clocks with an equal period 6*Tcm but different phases, each rising edge of the clock ck[p](for p=1 to 4) follows a rising edge of a (6*i+p)-th period of the clock ck_cm, with i being an integer; for example, the clock ck[1] rises at rising edges of a first period e1 and a seventh period e7 of the clock ck_cm, the clock ck[2] rises at rising edges of a second period e2 and a eighth period e8 of the clock ck_cm, the clock ck[3] rises at rising edges of a third period e3 and a ninth period e9 of the clock ck_cm, and the clock ck[4] rises at rising edges of a fourth period e4 and a tenth period e10 of the clock ck_cm. The clocks ck[6] to ck[8] are another set of clocks with an equal period 9'Tcm but different phases, each rising edge of the clock ck[p] (for p=6 to 8) follows a falling edge of a (9*i+2*(p−5))-th period of the clock ck_cm, with i being an integer; for example, the clock ck[6] rises at falling edges of the second period e2 and an eleventh period e11 of the clock ck_cm, the clock ck[7] rises at falling edges of the fourth period e4 and a thirteenth period e13 of the clock ck_cm, and the clock ck[8] rises at the falling edges of the sixth period e6 and a fifteenth period e15 of the clock ck_cm.

When triggering charging by the clocks ck[1] to ck[8], because the clocks ck[1] to ck[8] are of regular period(s) and phases, interference caused by charging is predictable, and is also controllable/manageable by arranging the clocks ck[1] to ck[8] to have different phases (staggered rising edges).

On the contrary to the normal mode, when the modules Md[1] to Md[N] operate in power-saving (idle, suspension, low-power, standby) mode for reducing power consumption and therefore drain less currents from the regulators rglt[1] to rglt[N], the modules Md[1] to Md[N] are expected to rapidly resume the normal mode when necessary. By operating in the second mode of dynamic charging which is advantageous in serving lighter loading and fast responding, the regulators rglt[1] to rglt[N] prevent delay for the modules Md[1] to Md[N] to switch from the power-saving mode to the normal mode, including longer response time of regular charging.

As shown in FIG. 4, the back-end circuit 420 may include an error amplifier 404, a predictor 412, a ramp comparator 406 and a ramp circuit 408. The error amplifier 404 has a positive input (labeled by "+" in FIG. 4) coupled to a constant reference voltage Vref, a negative input (labeled by "−") coupled to a feedback measurement of the output voltage Vout, and an output coupled to a control node nc, for driving the control node nc according to a different between the reference voltage Vref and the output voltage Vout. The predictor 412 is coupled to the node nc, a resistor R1, a first capacitor C1 and a second capacitor C2. The ramp comparator 406 is coupled to the node nc, the ramp circuit 408 and the controller 402. The ramp circuit 408 is coupled to the ramp comparator 406 and the controller 402.

In the first mode of regular charging, the back-end circuit 420 enables the driving signal sw to transit from the off-level to the on-level when a control voltage Vc at the node nc intersects a ramp signal Vramp, which starts ramping when a trigger signal S1 transits from the off-level to the on-level. For regular charging in the first mode, the back-end circuit 420 utilizes a clock ck of a constant frequency as the trigger signal S1. Operations in the first mode may be further described as follows. In the first mode, the predictor 412 conducts the first capacitor C1 to the node nc via the resistor R1 and stops conducting the second capacitor to the node nc via the resistor R1, so the error amplifier 404 builds the control voltage Vc at the node nc via the serially coupled resistor R1 and C1; the ramp circuit 408 controls the ramp signal Vramp to start ramping when the trigger signal S1 transits from the off-level to the on-level, and the ramp comparator 406 compares whether the control voltage Vc intersects the ramp signal Vramp and accordingly controls the driving signal sw to transit from the on-level to the off-level when the control voltage Vc intersects the ramp signal Vramp. As shown in FIG. 9a which illustrates operations in the first mode, the ramp comparator 406 controls the driving signal sw to transit from the off-level to the on-level when the control voltage Vc becomes greater than the ramp signal Vramp, and controls the driving signal sw0 to transit from the on-level to the off-level when the control voltage Vc becomes less than the ramp signal Vramp.

In the second mode of dynamic charging, the predictor 412 conducts the second capacitor C2 to the node nc via the resistor R1 and stops conducting the first capacitor C1 to the control node nc, so the error amplifier 404 builds the control voltage Vc at the node nc via the serially coupled resistor R1 and C2; and the back-end circuit 420 enables the driving signal sw to transit from the off-level to the on-level when the control voltage Vc reaches a second ramp signal Vramp2, as shown in FIG. 9b which illustrates operations in the second mode. In an embodiment of the second mode, the back-end circuit 420 controls the driving signal sw to stay at the on-level for a constant duration, and then transit back to the off-level. In the second mode, the ramp circuit 408 controls the ramp signal Vramp not to ramp, so as to reduce unnecessary power consumption. The ramp signal Vramp (FIG. 9a) in the first mode may be a saw-tooth wave which repeatedly ramps upward and then sharply drops. The second ramp signal Vramp2 (FIG. 9b) in the second mode may be a reverse saw-tooth wave which repeatedly ramps downward and then sharply rises.

The control voltage Vc are of different values respectively in the first mode and the second mode. When switching between the first mode and the second mode, time needed to fill the gap between the different values of the control voltage Vc may cause the output voltage Vout to suffer a deep droop, as discussed in FIG. 3b. For a smoother mode switching, the back-end circuit 420 of the invention switches from the second mode to the first mode by: when the second-to-first mode-switch criterion is satisfied, operating in a prediction mode before starting the first mode.

In the prediction mode, the back-end circuit 420 controls transition of the driving signal sw by the same scheme as the second mode (e.g., the dynamic charging scheme), and further utilizes the driving signal sw as the trigger signal S1 for triggering the ramp signal Vramp to start ramping when the driving signal sw transits from the off-level to the on-level, and records an end voltage Ve which the ramp signal Vramp reaches when the driving signal sw transits from the on-level to the off-level. The end voltage Ve is utilized to predict the value of the voltage Vc in the first mode. When exiting the prediction mode, the back-end circuit 420 sets the control voltage Vc to the end voltage Ve as an initial value to start the first mode, so as to suppress fluctuation of the output voltage Vout caused by switching modes. When starting the first mode, the back-end circuit 420 resumes to utilize the clock ck as the trigger signal S1.

Operations in the prediction mode may be further described as follows. Similar to the second mode, in the prediction mode, the predictor 412 conducts the second capacitor C2 to the node nc via the resistor R1, and stops conducting the first capacitor C1 to the node nc via the resistor R1, so the error amplifier 404 builds the control voltage Vc at the node nc via the serially coupled resistor R1 and C2, and the back-end circuit 420 enables the driving signal sw to transit from the on-level to the off-level when the control voltage Vc reaches the second ramp signal Vramp2. On the other hand, unlike the second mode in which the ramp circuit 408 stops ramping of the ramp signal Vramp, in the prediction mode, the ramp circuit 408 controls the ramp signal Vramp to start ramping when the trigger signal S1 (now the driving signal sw) transits from the off-level to the on-level. In the prediction mode, the predictor 412 further charges the first capacitor C1 when the driving signal sw is at the on-level, so as to record the end voltage Ve. Hence, when starting the first mode, the predictor 412 conducts the first capacitor C1 to the node nc1 for setting the control voltage Vc to the end voltage Ve, and stops conducting the second capacitor C2 to the control node nc.

Along with FIG. 4, please refer to FIG. 10 illustrating operations in the prediction mode. In the prediction mode, the back-end circuit 420 utilizes the driving signal sw as the trigger signal S1 for iteratively triggering the ramp signal Vramp to start ramping for a number of prediction cycles, and updates the end voltage Ve when the driving signal transits sw from the on-level to the off-level in each of the prediction cycles. As shown in FIG. 10, at a time point tk1 when the driving signal sw transits from the off-level to the on-level, a prediction cycle pc(1) starts; at a time point tk2, the driving signal sw transits from the on-level to the off-level, and the ramp signal Vramp reaches a voltage Ve(1) as a value of the end voltage Ve. To record the voltage Ve(1) as the end voltage Ve, the predictor 412 charges the first capacitor C1 to the voltage Ve(1) from the time points tk1 to tk2. At a time point tk3 when the driving signal sw iteratively transits from the off-level to the on-level, the prediction cycle pc(1) ends and a subsequent prediction cycle pc(2) starts. At a time point tk4, the driving signal sw transits from the on-level to the off-level, and the ramp signal Vramp reaches a voltage Ve(2). In order to update the end voltage Ve to the voltage Ve(2) of the prediction cycle pc(2), the predictor 412 discharges the first capacitor C1 from the time points tk2 to tk3 when the driving signal sw is at the off-level in the previous prediction cycle pc(1) for resetting the end voltage Ve, and then charges the first capacitor C1 from the time points tk3 to tk4 when the driving signal sw is at the on-level in the prediction cycle pc(2) for updating the end voltage Ve to the voltage Ve(2). At a time point tk5 when the driving signal sw iteratively transits from the off-level to the on-level, a new prediction cycle subsequent to the prediction cycle pc(2) begins.

In other words, in a prediction cycle pc(k), the predictor 412 charges the first capacitor C1 when the driving signal sw is at the on-level, so as to update the end voltage Ve to a voltage Ve(k) which the ramp signal Vramp reaches when the driving signal sw transits from the on-level to the off-level. And, in the prediction cycle pc(k), the predictor 412 discharges the first capacitor C1 when the driving signal sw1 is at the off-level, so as to reset the end voltage Ve for subsequent update of a following prediction cycle pc(k+1). In an ending prediction cycle pc(K) of the prediction mode, the predictor 412 charges the first capacitor C1 to a voltage Ve(K) which the ramp signal Vramp reaches when the driving signal sw transits from the on-level to the off-level, and maintains the end voltage V at the voltage Ve(K) to start the first mode. The prediction mode may last for a predefined time or a predefined number of prediction cycles.

Figure 11:
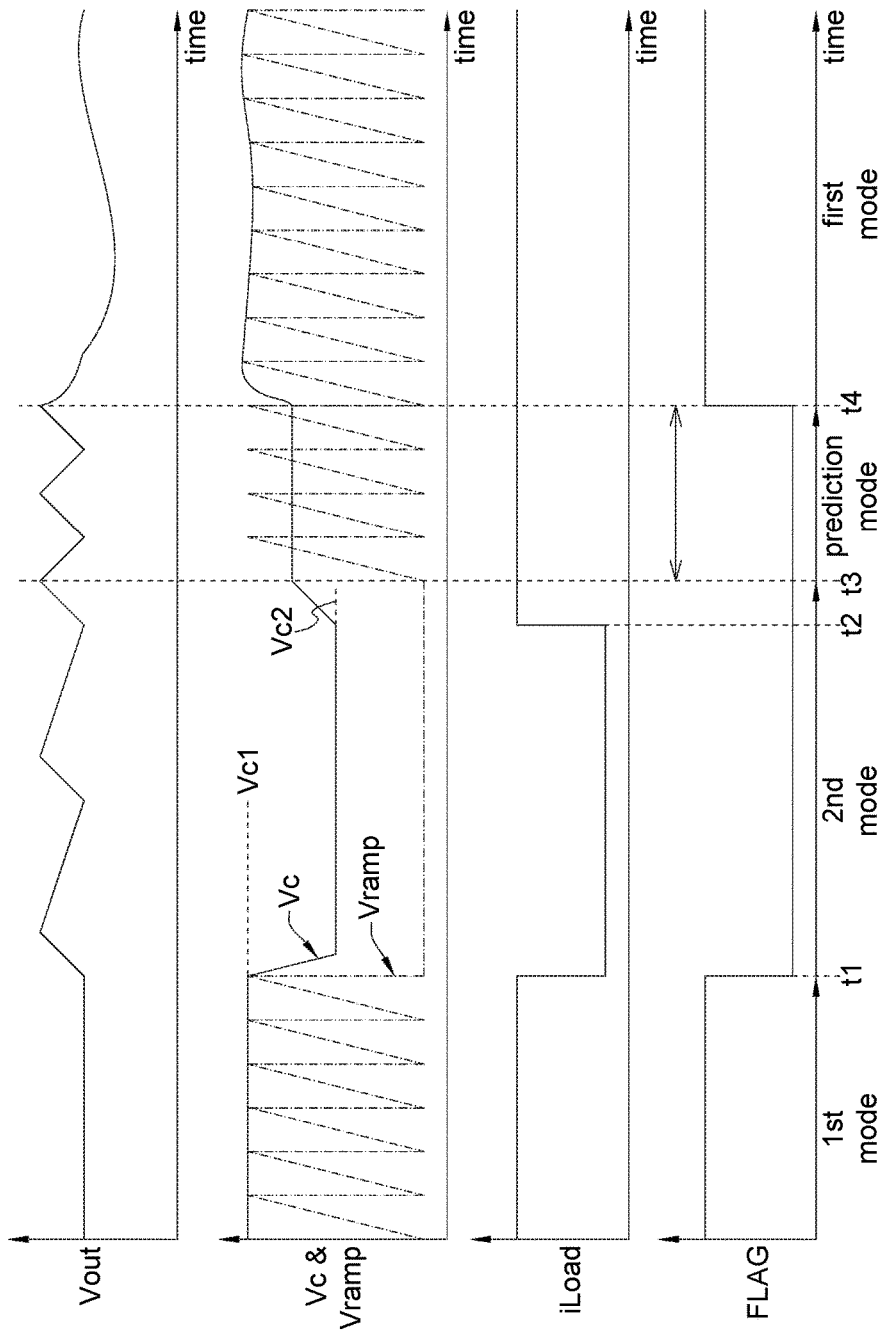
FIGS. 11 and 12 illustrates mode switching according to an embodiment of the invention.

Along with FIG. 4, please refer to FIG. 11 illustrating mode-switching operations of the regulator 400 by waveforms of the output voltage Vout, the control voltage Vc, the ramp signal Vramp, the load current iLD0 and a mode flag signal FLAG which is at a high level during the first mode, and at a low level when not in the first mode. As shown in FIG. 11, the regulator 400 operates in the first mode before a time point t1; in the first mode, the ramp signal Vramp ramps up and falls regularly, and the control voltage Vc remains steady at a voltage value Vc1 since the load current iLoad is not changing. At the time point t1, demand of the load current ILoad reduces, and the first-to-second mode-switch criterion is satisfied due to lighter loading; in response, the regulator 400 switches to the second mode with the ramp signal Vramp controlled to stop ramping, and the control voltage Vc starts to decrease because of the increasing output voltage Vop, and settles steadily at a voltage value Vc2. At a time point t2, demand of the load current iLoad increases. At a time point t3, the second-to-first mode-switch criterion is satisfied; in response, the regulator 400 operates in the prediction mode to prepare for the first mode.

As shown in FIG. 11, in the prediction mode, while the back-end circuit 420 continues operation of the second mode for controlling the driving signal sw according to comparison of the second ramp signal Vramp2 and the control voltage Vc which is built on the capacitor C2, the ramp signal Vramp for the first mode resumes ramping cycles under triggering of the driving signal sw (FIG. 4), thus the end voltage Ve is built on the capacitor C1. Comparing to the voltage value Vc2 of the second mode, the end voltage Ve will be closer to the voltage value Vc1 of the first mode. At a time point t4, the back-end circuit 420 ends the prediction mode, and starts the first mode by conducting the capacitor C1 to the node nc and insulating the capacitor C2 from the node nc. Thus, the control voltage Vc is set to the voltage Ve for fast approaching the expected voltage level Vc1 of the first mode, and fluctuation of the output voltage Vout caused by switching modes is effectively reduced.

Figure 12:
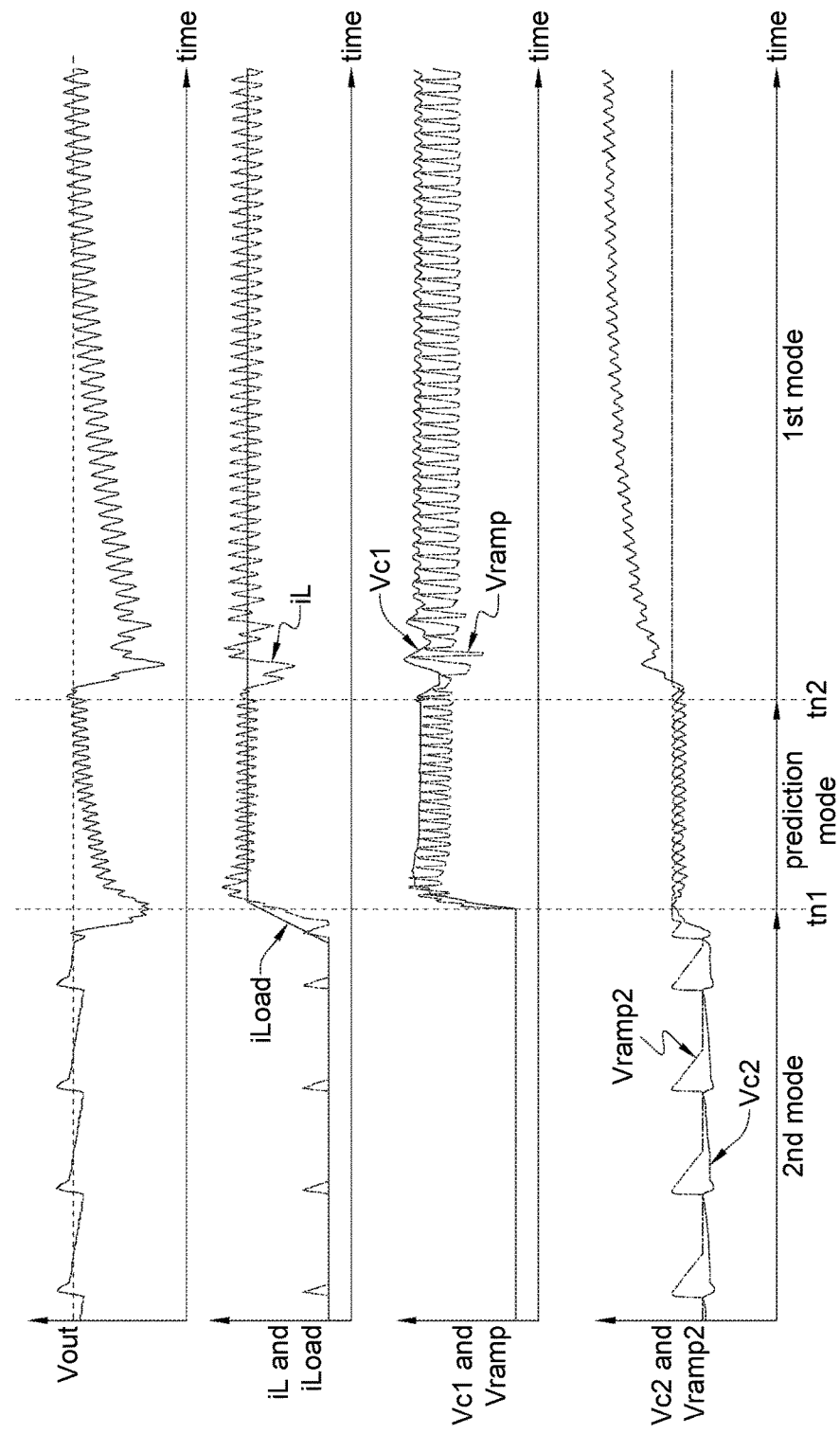

Along with FIG. 4, please refer to FIG. 12 illustrating mode switching of the regulator 400 according to an embodiment of the invention. FIG. 12 shows exemplary waveforms of the output voltage Vout, the currents iLoad and iL, the ramp signals Vramp and Vramp2, and voltages Vc1 and Vc2 respectively held by the capacitors C1 and C2. As shown in FIG. 12, the regulator 400 operates in the second mode before a time point tn1. In the second mode, the control voltage Vc equals to the voltage Vc2 held by the capacitor C2 because the predictor 412 conducts the capacitor C2 to the node nc, and the driving signal sw transits according to comparison of the control voltage Vc and the second ramp signal Vramp2 (e.g., FIG. 9b). On the other hand, in the second mode, the predictor 412 does not conduct the capacitor C1 to the node nc, the ramp signal Vramp is not triggered to ramp, and the voltage Vc1 held by the capacitor C1 remains flat.

As demand of the load current iLoad rises, the second-to-first mode-switch criterion is satisfied at the time point tn1, and the regulator 400 switches to the prediction mode. In the prediction mode, the control voltage Vc also equals to the voltage Vc2 held by the capacitor C2 because the predictor 412 still conducts the capacitor C2 to the node nc, and the driving signal sw transits according to comparison of the control voltage Vc and the second ramp signal Vramp2 (e.g., FIG. 9b). On the other hand, in the prediction mode, the predictor 412 does not conduct the capacitor C1 to the node nc, but the ramp signal Vramp is triggered to ramp by the driving signal sw, and the predictor 412 records values of the end voltage Ve by the voltage Vc1 of the capacitor C1 (e.g., FIG. 10).

At a time point tn2, the prediction mode ends and the first mode starts. In the first mode, the control voltage Vc equals to the voltage Vc1 held by the capacitor C1 because the predictor 412 conducts the capacitor C1 to the node nc, and the driving signal sw transits according to comparison of the control voltage Vc and the ramp signal Vramp (e.g., FIG. 9a) which is triggered to ramp by the clock ck. On the other hand, in the first mode, the predictor 412 does not conduct the capacitor C2 to the node nc, the ramp signal Vramp2 is not triggered to ramp, and thus remains flat.

Figure 13:
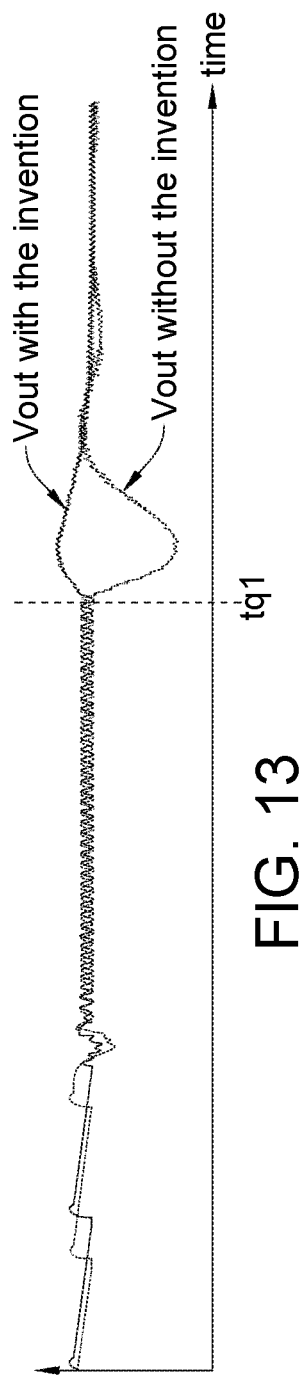
FIG. 13 compares mode switching performances with and without the prediction mode of the invention.

Please refer to FIG. 13 comparing performances of mode switching with and without the prediction mode of the invention. As shown in FIG. 13, when switching to the first mode at a time point tq1, the output voltage Vout suffers greater undesired fluctuation without adopting the prediction mode of the invention. Contrarily, with the prediction mode of the invention, fluctuation of the output voltage Vout is effectively suppressed and mitigated.

To sum up, the DC-DC regulator according to the invention utilizes hybrid modes (e.g., modes of regular charging and dynamic charging) with beneficial mode-switch criterions and advantageous mode-switch operations (e.g., switching modes by transitional prediction mode in between), and therefore leverages full advantages of the modes, avoids disadvantages of the modes, and achieves smoother switching between the modes.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A regulator for DC-DC hybrid-mode power regulation of an output voltage and a load current, comprising:
   a controller for controlling the output voltage and the load current by charging a connection node when a driving, signal is at an on-level, and stopping charging the connection node when the driving signal is at an off-level; and
   a back-end circuit coupled to the controller, capable of switching between a first mode and a second mode to control transition of the driving signal by different schemes; wherein:
   the back-end circuit switches from the second mode to the first mode when a mode-switch criterion is satisfied;
   whether the mode-switch criterion is satisfied is independent of a measurement of the output voltage;
   in the first mode, the back-end circuit enables the driving signal to transit from the off-level to the on-level when a control voltage intersects a ramp signal which starts ramping when a trigger signal transits from the off-level to the on-level; and
   the back-end circuit switches from the second mode to the first mode by:
   when the mode-switch criterion is satisfied, operating in a prediction mode before starting the first mode;
   in the prediction mode, controlling transition of the driving signal by the same scheme as the second mode, and further utilizing the driving signal as the trigger signal for triggering the ramp signal to start ramping when the driving signal transits from the off-level to the on-level, and recording an end voltage which the ramp signal reaches when the driving signal transits from the on-level to the off-level; and
   when exiting the prediction mode, setting the control voltage to the end voltage to start the first mode.

2. The regulator of claim 1, wherein the back-end circuit switches from the second mode to the first mode further by:
   when starting the first mode, utilizing a clock of a constant frequency as the trigger signal.

3. The regulator of claim 1, wherein the control voltage is a voltage at a control node, and the back-end circuit comprises:
   an error amplifier coupled to the control node for driving the control node according to a different between a reference voltage and the output voltage,
   a predictor coupled to the control node, a first capacitor and a second capacitor; wherein:
   in the second mode and the prediction mode, the predictor conducts the second capacitor to the control node, and stops conducting the first capacitor to the control node;
   in the prediction mode, the predictor charges the first capacitor, so as to record the end voltage;
   when starting the first mode, the predictor conducts the first capacitor to the control node for setting the control voltage to the end voltage, and stops conducting the second capacitor to the control node.

4. The regulator of claim 3, wherein:
   in the prediction mode, the back-end circuit utilizes the driving signal as the trigger signal for iteratively triggering the tamp signal to start ramping for a number of prediction cycles, and updates the end voltage in each of the prediction cycles.

5. The regulator of claim 4, wherein:
   in each of the prediction cycles, the predictor charges the first capacitor when the driving signal is at the on-level to update the end voltage.

6. The regulator of claim 5, wherein:
   in one of the prediction cycles, the predictor discharges the first capacitor when the driving signal is at the off-level.

7. The regulator of claim 3, wherein the back-end circuit further comprises:

a ramp comparator coupled to the control node, and
a ramp circuit coupled to the ramp comparator; wherein
in the first mode, the ramp comparator compares whether the control voltage intersects the ramp signal;
in the first mode and the prediction mode, the ramp circuit controls the ramp signal to start ramping when the trigger signal transits from the off-level to the on-level; and
in the second mode, the ramp circuit controls the ramp signal not to ramp.

8. A regulator for DC-DC hybrid-mode power regulation of an output voltage and a load current, comprising:
a controller for controlling the output voltage and the load current by charging a connection node when a driving signal is at an on-level, and stopping charging the connection node when the driving signal is at an off-level; and
a back-end circuit coupled to the controller, capable of switching between a first mode and a second mode to control transition of the driving signal by different schemes; wherein:
in the first mode, the back-end circuit utilizes a clock as a trigger signal, and controls the driving signal to transit from the off-level to the on-level when a control voltage intersects a ramp signal which starts ramping when the trigger signal transits from the off-level to the on-level; and
the back-end circuit switches from the second mode to the first mode by:
operating in a prediction mode before starting the first mode,
in the prediction mode, controlling transition of the driving signal by the same schemes as the second mode, and further utilizing the driving signal as the trigger signal for triggering the ramp signal to start ramping when the driving signal transits from the off-level to the on-level, and recording an end voltage which the ramp signal reaches when the driving signal transits from the on-level to the off-level; and
when exiting the prediction mode, setting the control voltage to the end voltage to start the first mode.

9. The regulator of claim 8, wherein:
in the prediction mode, the back-end circuit utilizes the driving signal as the trigger signal for iteratively triggering the ramp signal to start ramping for a number of prediction cycles, and updates the end voltage in cacti of the prediction cycles.

10. The regulator of claim 8, wherein the control voltage is a voltage at a control node, and the back-end circuit comprises:
a predictor coupled to the control node, a first capacitor and a second capacitor; wherein:
in the second mode and the prediction mode, the predictor conducts the second capacitor to the control node, and stops conducting the first capacitor to the control node;
in the prediction mode, the predictor charges the first capacitor when the driving signal is at the on-level, so as to record the end voltage;
when starting the first mode, the predictor conducts the first capacitor to the control node for setting the control voltage to the end voltage, and stops conducting the second capacitor to the control node.

* * * * *